(12) United States Patent
Kang et al.

(10) Patent No.: US 10,220,355 B2
(45) Date of Patent: Mar. 5, 2019

(54) COMPOUND FOR FOULING RESISTANCE, MEMBRANE FOR FOULING RESISTANCE, AND METHOD OF PREPARING MEMBRANE FOR FOULING RESISTANCE

(71) Applicant: Samsung Electronics Co., Ltd., Suwon-si, Gyeonggi-do (KR)

(72) Inventors: Hyo Kang, Seoul (KR); Sung Soo Han, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 428 days.

(21) Appl. No.: 15/103,120

(22) PCT Filed: Dec. 8, 2014

(86) PCT No.: PCT/KR2014/012009
§ 371 (c)(1),
(2) Date: Jun. 9, 2016

(87) PCT Pub. No.: WO2015/088210
PCT Pub. Date: Jun. 18, 2015

(65) Prior Publication Data
US 2018/0133662 A1   May 17, 2018

(30) Foreign Application Priority Data
Dec. 9, 2013 (KR) .......................... 10-2013-0152663

(51) Int. Cl.
| | |
|---|---|
| *C02F 1/44* | (2006.01) |
| *B01D 65/08* | (2006.01) |
| *B01D 67/00* | (2006.01) |
| *B01D 69/02* | (2006.01) |
| *B01D 71/40* | (2006.01) |
| *B01D 71/68* | (2006.01) |
| *B01D 71/76* | (2006.01) |
| *C08F 120/30* | (2006.01) |
| *C08F 220/30* | (2006.01) |
| *C08F 220/58* | (2006.01) |

(52) U.S. Cl.
CPC ............ *B01D 71/76* (2013.01); *B01D 65/08* (2013.01); *B01D 67/0009* (2013.01); *B01D 69/02* (2013.01); *B01D 71/40* (2013.01); *B01D 71/68* (2013.01); *C08F 120/30* (2013.01); *C08F 220/30* (2013.01); *C08F 220/58* (2013.01); *B01D 2325/36* (2013.01); *B01D 2325/48* (2013.01); *C02F 1/445* (2013.01); *C08F 2220/302* (2013.01)

(58) Field of Classification Search
CPC ...... B01D 65/08; B01D 67/009; B01D 69/02; B01D 71/40; B01D 71/68; B01D 71/76; B01D 2325/36; B01D 2325/48; C08F 120/30; C08F 220/30; C08F 220/58; C08F 2220/302; C02F 1/445
See application file for complete search history.

(56) References Cited

U.S. PATENT DOCUMENTS

| | | | |
|---|---|---|---|
| 7,928,176 B2 * | 4/2011 | Pacetti ............... | A61L 27/34 526/277 |
| 8,017,050 B2 | 9/2011 | Freeman et al. | |
| 8,309,674 B2 | 11/2012 | Dai et al. | |
| 9,221,019 B2 | 12/2015 | Kang et al. | |
| 2010/0059433 A1 | 3/2010 | Freeman et al. | |
| 2011/0052788 A1 | 3/2011 | Messersmith et al. | |
| 2012/0111791 A1 | 5/2012 | Freeman et al. | |
| 2012/0298574 A1 | 11/2012 | Kang et al. | |
| 2013/0112615 A1 | 5/2013 | Kang et al. | |

FOREIGN PATENT DOCUMENTS

| | | |
|---|---|---|
| JP | 2002-053408 A | 2/2002 |
| KR | 20110042307 A | 4/2011 |
| KR | 20120132164 A | 12/2012 |
| KR | 20130049113 A | 5/2013 |
| KR | 20140042382 A | 4/2014 |
| KR | 20150000789 A | 1/2015 |
| WO | WO-2007120631 A1 | 10/2007 |
| WO | WO-2014209019 A1 | 12/2014 |

OTHER PUBLICATIONS

D.-G. Kim, H. Kang, Y.-S. Choi, S. Han, J.-C. Lee, "Photo-cross-linkable star-shaped polymers with poly(ethylene glycol) and renewable cardanol side groups: synthesis, characterization, and application to antifouling coatings for filtration membranes", Polymer Chemistry,2013, 4, 5065-5073.*

Yong Hwan Kim et al., "Polymerization of cardanol using soybean peroxidase and its potential application as anti-biofilm coating material" Biotechnology Letters, Kluwer Academic Publishers, 1521-1524, 2003.

Christophe Blazykowshi et al., "Surface chemistry to minimize fouling from blood-based fluids" Chem Soc. Rev., 2012, 41, 5599-5612.

Feng Zhang et al., "Simple Method to Fabricate an Biocompatible Antibacterial Surface on a Versatile Substrate through an Antiadhesion Approach" Chem. Lett. 2012, 41, 1655-1657.

Sangyoup Lee et al., "Comparison of fouling behavior in forward osmosis (FO) and reverse osmosis (RO)" Journal of Membrane Science 365, (2010) 34-39.

Dong-Gyun Kim et al., "Photo-cross-linkable star-shaped polymers with poly(ethylene glycol) and renewable cardanol side groups: synthesis, characterization, and application to antifouling coatings for filtration membranes" Polymer Chemistry. 2013, vol. 4, No. 19, pp. 5065-5073.

Do-Young Yoon et al., "Molecular design of anti-biofouling materials from natural phenolic compounds" Korean J. Chem. Eng., 26(2), 433-437 (2009).

Hua Han et al., "Immobilization of Amphiphilic Polycations by Catechol Functionality for Antimicrobial Coatings" Langmuir 2011, 27, 4010-4019.

(Continued)

*Primary Examiner* — James C Goloboy
(74) *Attorney, Agent, or Firm* — Harness, Dickey & Pierce, P.L.C.

(57) ABSTRACT

A fouling resistant and antibiotic copolymer including a first structural unit and a second structural unit is disclosed.

18 Claims, 7 Drawing Sheets

(56) References Cited

OTHER PUBLICATIONS

Daniel R. Dreyer et al., "Elucidating the Structure of Poly(dopamine)" Langmuir 2012, 28, 6428-6435.
Haeshin Lee et al., "Mussel-Inspired Surface Chemistry for Multifunctional Coatings" Science, vol. 318, pp. 426-430.
Paul Glass et al., "Enhanced Wet Adhesion and Shear of Elastomeric Micro-Fiber Arrays with Mushroom Tip Geometry and a Photopolymerized p(DMA-co-MEA) Tip Coating" Langmuir 2010, 26 (22), p. 17357-17362.
International Search Report PCT/ISA/210 and Written Opinion of the International Searching Authority PCT/ISA/237 for International Application No. PCT/KR2014/012009 dated Mar. 24, 2016.

\* cited by examiner

[Figure 1]
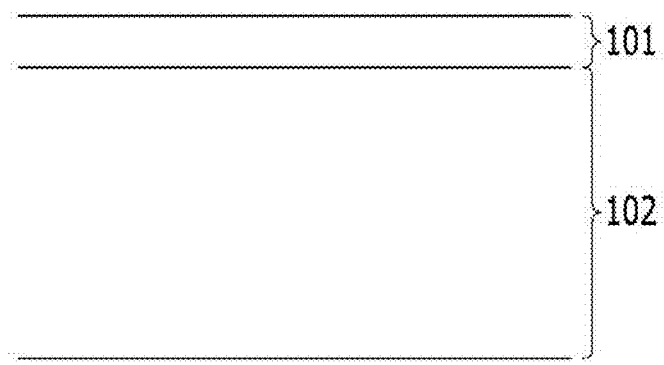

[Figure 2]
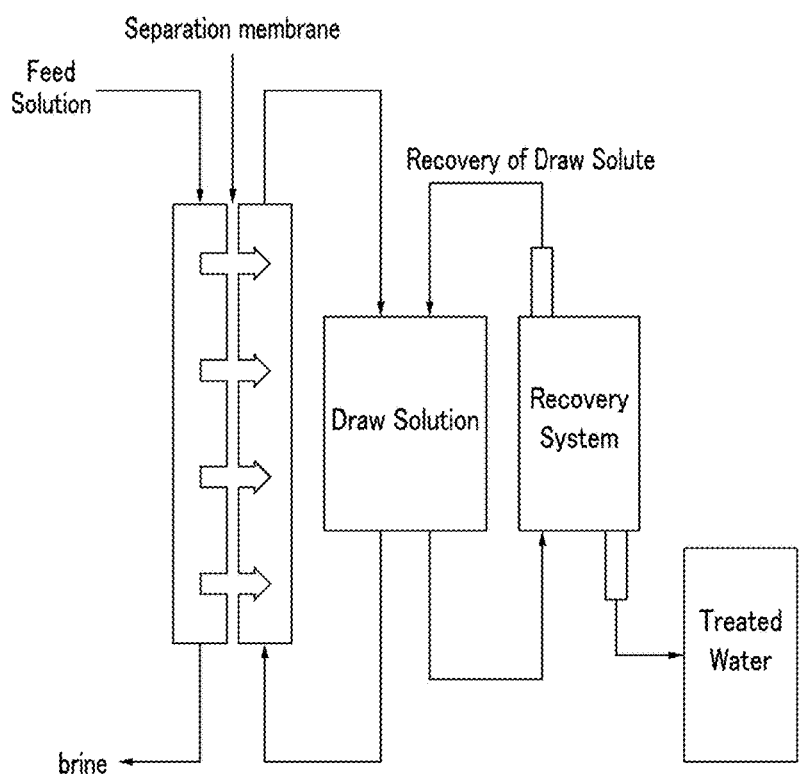

[Figure 3]
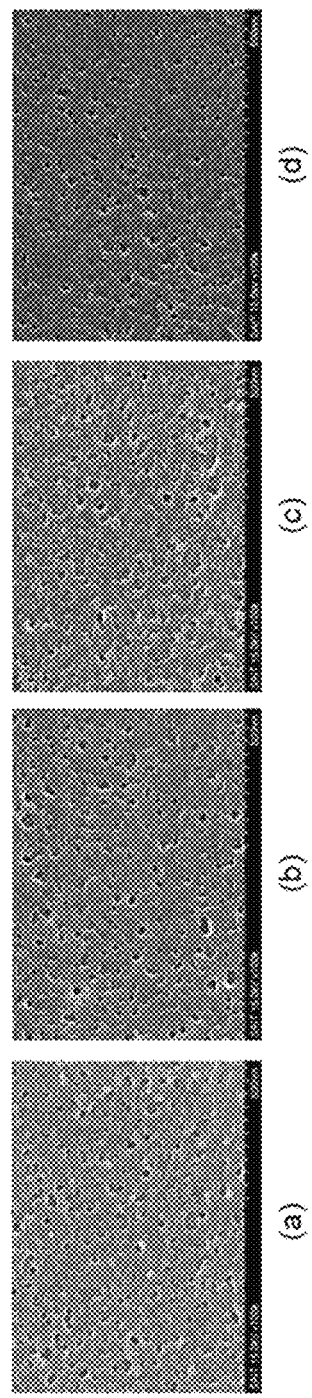

[Figure 4]
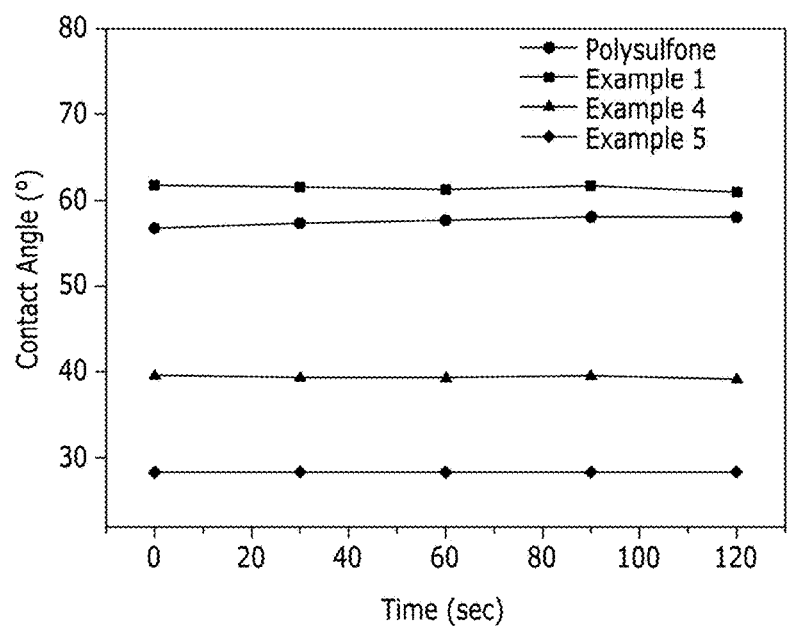

[Figure 5]
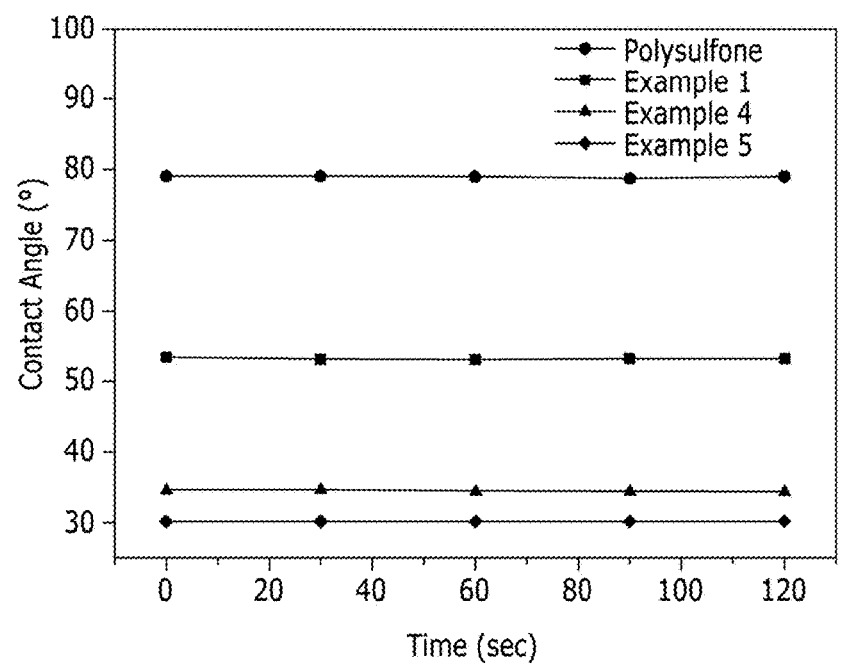

[Figure 6]
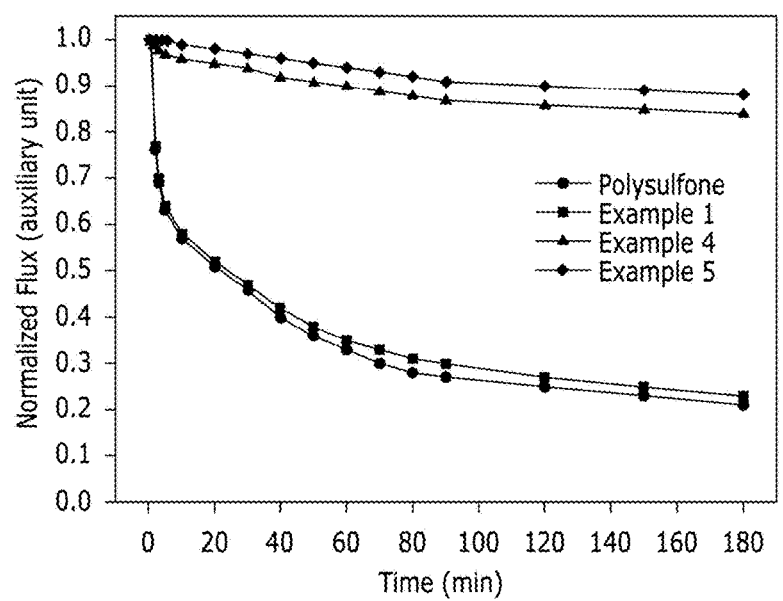

[Figure 7]
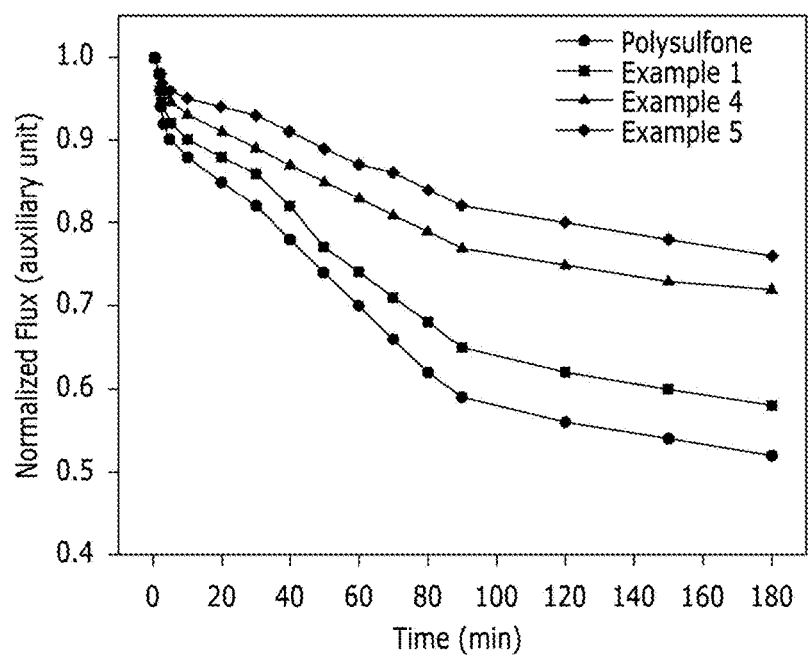

COMPOUND FOR FOULING RESISTANCE, MEMBRANE FOR FOULING RESISTANCE, AND METHOD OF PREPARING MEMBRANE FOR FOULING RESISTANCE

CROSS REFERENCE TO RELATED APPLICATIONS

This is a National Stage Application under 35 U.S.C. § 371 of International Application No. PCT/KR2014/012009, filed Dec. 8, 2014, which claims priority under 35 U.S.C. § 119 to Korean Application No. 10-2013-0152663, filed Dec. 9, 2013, the entire contents of each of which are hereby incorporated herein by reference.

TECHNICAL FIELD

An organic/inorganic hybrid compound for fouling resistance, a membrane for fouling resistance, and a method of preparing the membrane for fouling resistance are disclosed.

BACKGROUND ART

Membrane fouling is one important problem in the membrane industry. It is characterized by a decrease in membrane permeation flux over time, which is generally induced by components in a feed solution passing through the membrane. It may be caused by molecule adsorption in the membrane pores, pore blocking, or cake formation on the membrane surface. A decrease in permeation flux increases operation energy use, and to overcome this, cleaning is required. However, this is only a temporary solution, and fouling typically decreases the life-span of the membrane.

As a method for reducing fouling of membranes for reverse osmotic pressure (RO), forward osmotic pressure (FO), ultrafiltration (UF), and microfiltration (MF), introduction of a hydrophilic surface to the membrane is a fundamental solution that is capable of providing fouling resistance while increasing the life-span of the membrane.

To increase fouling resistance of a membrane by graft polymerization of a hydrophilic group on the membrane surface, various hydrophilic monomers are grafted to various synthesis membranes to restrict fouling by microorganisms such as bacteria and the like and natural organic materials such as proteins and the like. An important drawback of the surface modification method is in initiation of graft polymerization using high energy gamma radiation or plasma. This approach may increase membrane manufacture cost, and it is not controlled well.

Another method for producing a fouling resistant surface is to manufacture a membrane including a microphase-separated polyacrylonitrile amphiphilic graft copolymer. Although it has drawbacks that a novel material should be developed through synthesis and a membrane manufacturing method should be established to manufacture a separation membrane, this method may minimize transformation of the membrane and impart long-term stability.

Another method for producing a membrane for fouling resistance is to introduce polymeric additives having hydrophilicity during manufacture of a membrane. Since this method does not require a processing step in the manufacture of a membrane, the cost is limited, and it is easily incorporated into the existing membrane casting process. To obtain uniform pore size, comparatively homogeneous polymers should be used, however, in this system, strong chemical bonding scarcely occurs, and thus the hydrophilic polymeric additives are discharged to deteriorate long-term stability.

The easiest method of producing a membrane for fouling resistance is to coat a hydrophilic material on the surface of a manufactured membrane. This approach is close to commercialization now, and has been actively researched.

DISCLOSURE

Technical Problem

One embodiment provides a copolymer having decreasing effects of biofouling and oil fouling.

Another embodiment provides a fouling resistant and antibiotic membrane including the copolymer.

Yet another embodiment provides a water treatment device including the fouling resistant and antibiotic membrane.

Technical Solution

According to one embodiment, a fouling resistant copolymer including a first structural unit represented by the following Chemical Formula 1, and a second structural unit represented by the following Chemical Formula 2 is provided.

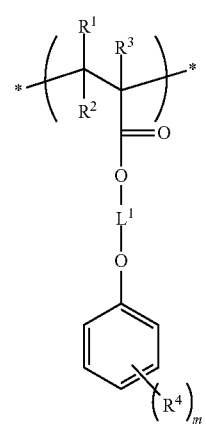

(Chemical Formula 1)

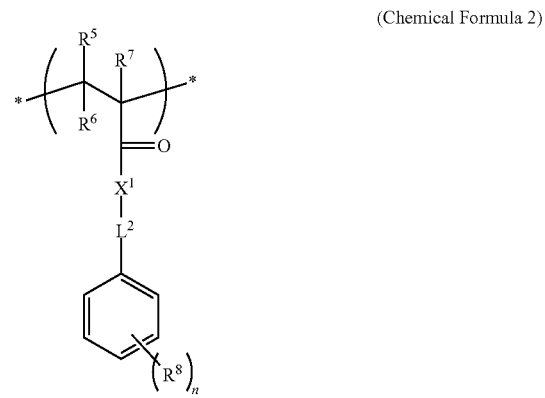

(Chemical Formula 2)

In Chemical Formulae 1 and 2, $R^1$ to $R^3$ and $R^5$ to $R^7$ are independently hydrogen, a substituted or unsubstituted C1 to C20 alkyl group, a substituted or unsubstituted C6 to C20 aryl group, a substituted or unsubstituted C3 to C20 cycloalkyl group, a substituted or unsubstituted C1 to C20 heterocycloalkyl group, a substituted or unsubstituted C5 to C20 heteroaryl group, a substituted or unsubstituted C2 to C20 alkylaryl group, or a substituted or unsubstituted C2 to C30 arylalkyl group, $L^1$ and $L^2$ are a single bond, a substituted or unsubstituted C1 to C20 alkylene group, a substituted or unsubstituted C2 to C20 alkenylene group, a substituted or unsubstituted C5 to C20 arylene group, a substituted or unsubstituted C3 to C20 cycloalkylene group, a substituted or unsubstituted C1 to C20 heterocycloalkylene group, a substituted or unsubstituted C1 to C30 heteroarylene group, a substituted or unsubstituted C2 to C20 alkylarylene group, a substituted or unsubstituted C2 to C20 arylalkylene group, or at least one combination of foregoing groups linked to each other, $X^1$ is a single bond, —O—, —NH—, a substituted or unsubstituted C1 to C20 alkylene group, a substituted or unsubstituted C2 to C20 alkenylene group, a substituted or unsubstituted C5 to C20 arylene group, a substituted or unsubstituted C3 to C20 cycloalkylene group, a substituted or unsubstituted C1 to C20 heterocycloalkylene group, a substituted or unsubstituted C1 to C20 heteroarylene group, a substituted or unsubstituted C2 to C20 alkylarylene group, a substituted or unsubstituted C2 to C20 arylalkylene group, or a combination of foregoing groups linked to each other, $R^4$ is independently a C1 to C30 alkyl group, a C5 to C30 alkylsilyl group, a C3 to C30 cycloalkyl group, a C2 to C30 heterocycloalkyl group, a C6 to C30 aryl group, a C2 to C30 heteroaryl group, a C1 to C30 alkoxy group, a C1 to C30 fluoroalkyl group, a C5 to C30 alkenyl group having at least one double bond, or a C5 to C30 alkynyl group having at least one triple bond, provided that at least one thereof is a saturated or unsaturated hydrocarbon group having a carbon number of 4 or more, $R^8$ is independently —OH, —COOH, —NH$_2$, —SH, —SO$_3$H, —F, —Cl, —Br, —I, a C1 to C10 alkyl group, a C2 to C10 alkenyl group, a C3 to C20 cycloalkyl group, a C2 to C20 heterocycloalkyl group, a C6 to C20 aryl group, a C2 to C20 heteroaryl group, a C1 to C10 alkoxy group, or a C1 to C10 fluoroalkyl group, provided at least two thereof are OH groups, m is an integer of 1 to 5, and n is an integer of 2 to 5.

In the above Chemical Formula 1, $R^1$ to $R^3$ may be hydrogen or a C1 to C4 alkyl group, $L^1$ may be a substituted or unsubstituted C1 to C10 alkylene group, $R^4$ may be a C4 to C30 alkyl group or a C4 to C30 alkenyl group including 1 to 5 double bonds, and m may be 1 or 2.

In the above Chemical Formula 2, $R^5$ to $R^7$ may be hydrogen or a C1 to C4 alkyl group, $L^2$ may be a substituted or unsubstituted C1 to C10 alkylene group, $X^1$ may be —O—, —NH—, or a C1 to C20 alkylene group, $R^8$ may be —OH, and n may be 2.

The above Chemical Formula 1 may be represented by the following Chemical Formula 3.

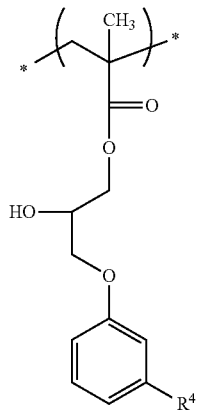

(Chemical Formula 3)

In the above Chemical Formula 3, $R^4$ is the same as defined in the above Chemical Formula 1, for example, a C4 to C30 alkyl group or a C4 to C30 alkenyl group including 1 to 5 double bonds.

The above Chemical Formula 2 may be represented by the following Chemical Formula 4.

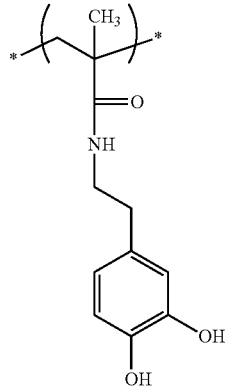

(Chemical Formula 4)

The copolymer may be represented by the following Chemical Formula 5.

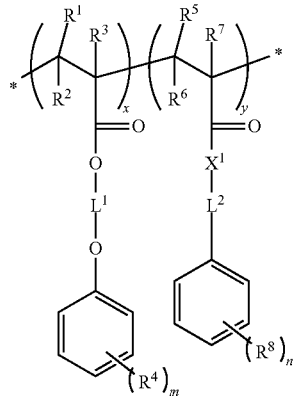

(Chemical Formula 5)

In the above Chemical Formula 5, $R^1$ to $R^8$, $L^1$, $L^2$, $X^1$, m, and n are the same as defined in the Chemical Formulae 1 and 2.

In the above Chemical Formula 5, x and y indicate each mole fraction of the structural unit represented by the above Chemical Formula 1 and the structural unit represented by the above Chemical Formula 2, $0<x\leq0.5$, and $0.5\leq y<1$.

The copolymer may have a number average molecular weight of about 3000 to about 100,000.

The copolymer may be represented by the following Chemical Formula 6.

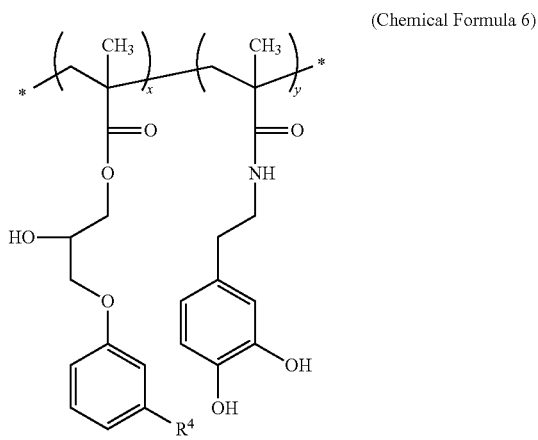

(Chemical Formula 6)

In the above Chemical Formula 6, $R^4$ is the same as defined in the above Chemical Formula 1, and x and y are the same as defined in the above Chemical Formula 5.

In one exemplary embodiment, $R^4$ in the copolymer represented by the above Chemical Formula 6 may be a mixture of the saturated and unsaturated hydrocarbon groups.

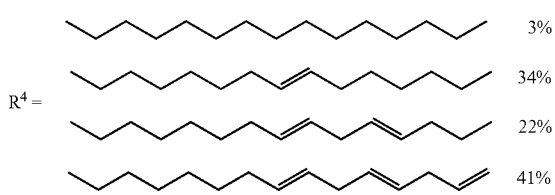

According to yet another embodiment, a fouling resistant and antibiotic membrane including the copolymer including the structural unit of the above Chemical Formula 1 and the structural unit of the above Chemical Formula 2 is provided.

The fouling resistant and antibiotic membrane may include an inner layer including a membrane requiring fouling resistance and antibiotic characteristics, and a surface layer including the copolymer on the surface of the inner layer.

The fouling resistant and antibiotic membrane may be a membrane for water treatment, for example a separation membrane for water treatment. The separation membrane for water treatment may be a microfiltration membrane, an ultrafiltration membrane, a nanofiltration membrane, a reverse osmosis membrane, or a forward osmosis membrane, and for example, the inner layer may be a separation membrane being a microfiltration membrane, an ultrafiltration membrane, a nanofiltration membrane, a reverse osmosis membrane, or a forward osmosis membrane.

The inner layer may be a single membrane formed of a homogeneous material, or a hybrid membrane including a plurality of layers formed of a heterogeneous material.

The inner layer may include a pore.

The surface layer in the separation membrane may be formed by solvent casting, spin casting, wet spinning, dry spinning, injecting, or melt spinning, on the inner layer.

When the surface layer is coated on the inner layer, the copolymer may be used in solution at a concentration of about 0.1 wt % to about 50 wt % in a solvent. The surface layer formed using the method may be a continuous coating layer or discontinuous coating layer.

The inner layer may include at least one selected from a polyacrylate-based compound, a polymethacrylate-based compound, a polystyrene-based compound, a polycarbonate-based compound, a polyethylene terephthalate-based compound, a polyimide-based compound, a polybenzimidazole-based compound, a polybenzthiazole-based compound, a polybenzoxazole-based compound, a polyepoxy-based resin compound, a polyolefin-based compound, a polyphenylene vinylene compound, a polyamide-based compound, a polyacrylonitrile-based compound, a polysulfone-based compound, a cellulose-based compound, polyvinylidene fluoride (PVDF), polytetrafluoroethylene (PTFE), and a polyvinyl chloride (PVC) compound.

In another embodiment, a water treatment device including the separation membrane for water treatment is provided.

The water treatment device may be a forward osmosis water treatment device or a reverse osmosis water treatment device.

Advantageous Effects

The membrane prepared from the copolymer according to an embodiment may have an extended lifetime due to the enhanced biofouling resistance and oil-fouling resistance, as well as being cost effective in maintaining or managing the membrane. Further, the membrane may be useful in treating water for drinking due to its good antibacterial function.

DESCRIPTION OF DRAWINGS

FIG. 1 is a schematic view of a fouling resistant and antibiotic membrane including a surface layer 101 and an inner layer 102.

FIG. 2 is a schematic view showing a forward osmosis water treatment device according to an exemplary embodiment.

FIG. 3 shows scanning electron microscope (SEM) photographs of a commercially-available polysulfone membrane (a) and separation membranes obtained in Example 1 (b), Example 4 (c), and Example 5 (d).

FIG. 4 is a graph showing contact angles of the commercially-available polysulfone membrane and the separation membranes of Examples 1, 4, and 5 with water.

FIG. 5 is a graph showing contact angles of the commercially-available polysulfone membrane and the separation membranes of Examples 1, 4, and 5 with decane.

FIG. 6 is a graph showing anti-biofouling characteristics of the commercially-available polysulfone membrane and the separation membranes of Examples 1, 4, and 5.

FIG. 7 is a graph showing anti-oil fouling characteristics of the commercially-available polysulfone membrane and the separation membranes of Examples 1, 4, and 5.

BEST MODE

The present disclosure will be described more fully hereinafter with reference to the accompanying drawings, in which exemplary embodiments of this disclosure are shown. However, this disclosure may be embodied in many different forms and is not construed as limited to the exemplary embodiments set forth herein.

As used herein, when a definition is not otherwise provided, the term "substituted" may refer to one substituted with a halogen (F, Cl, Br, or I), a hydroxy group, a nitro group, a cyano group, an imino group (=NH or =NR', where R' is a C1 to C10 alkyl group), an amino group (—NH$_2$, —NH(R"), or —N(R''')(R''''), where R" to R'''' are independently a C1 to C10 alkyl group), an amidino group, a hydrazine group, a hydrazone group, a carboxyl group, a C1 to C30 alkyl group, a C1 to C30 alkylsilyl group, a C3 to C30 cycloalkyl group, a C2 to C30 heterocycloalkyl group, a C6 to C30 aryl group, a C2 to C30 heteroaryl group, a C1 to C30 alkoxy group, or a C1 to C30 fluoroalkyl group.

As used herein, when a definition is not otherwise provided, the prefix "hetero" may refer to one including 1 to 3 heteroatoms selected from N, O, S, and P, and remaining carbons in a compound or a substituent.

As used herein, when a definition is not otherwise provided, the term "combination thereof" refers to at least two substituents bound to each other by a linker, or at least two substituents condensed to each other.

As used herein, when a definition is not otherwise provided, the term "alkyl group" may refer to a "saturated alkyl group" without an alkene group or an alkyne group, or an "unsaturated alkyl group" including at least one of an alkene group and an alkyne group. The term "alkenyl group" may refer to a substituent in which at least two carbon atoms are bound in at least one carbon-carbon double bond, and the term "alkynyl group" refers to a substituent in which at least two carbon atoms are bound in at least one carbon-carbon triple bond. The alkyl group may be a branched, linear, or cyclic alkyl group.

The alkyl group may be a C1 to C20 alkyl group, and more specifically a C1 to C6 alkyl group, a C7 to C10 alkyl group, or a C11 to C20 alkyl group.

For example, a C1-C4 alkyl group may have 1 to 4 carbon atoms, and may be selected from the group consisting of methyl, ethyl, propyl, iso-propyl, n-butyl, isobutyl, sec-butyl, and t-butyl.

Examples of the alkyl group include a methyl group, an ethyl group, a propyl group, an isopropyl group, a butyl group, an isobutyl group, a t-butyl group, a pentyl group, a hexyl group, an ethenyl group, a propenyl group, a butenyl group, a cyclopropyl group, a cyclobutyl group, a cyclopentyl group, a cyclohexyl group, and the like.

The term "aromatic group" may refer a substituent including a cyclic structure where all elements have p-orbitals which form conjugation. An aryl group and a heteroaryl group may be exemplified.

The term "aryl group" may refer to a monocyclic or fused ring-containing polycyclic (i.e., rings sharing adjacent pairs of carbon atoms) groups.

The "heteroaryl group" may refer to one including 1 to 3 heteroatoms selected from N, O, S, or P in an aryl group, and remaining carbons. When the heteroaryl group is a fused ring, each ring may include 1 to 3 heteroatoms.

As used herein, "*" indicates a point where the same or different atoms or chemical formulas are linked to each other.

According to one embodiment, a fouling resistant and antibiotic copolymer including a first structural unit represented by the following Chemical Formula 1 and a second structural unit represented by the following Chemical Formula 2 is provided.

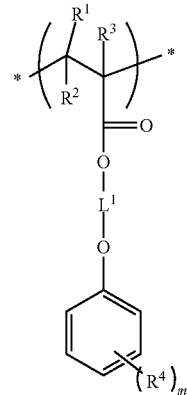

(Chemical Formula 1)

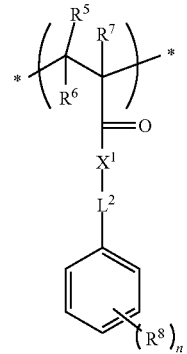

(Chemical Formula 2)

In the above Chemical Formulae 1 and 2, $R^1$ to $R^3$ and $R^5$ to $R^7$ are independently hydrogen, a substituted or unsubstituted C1 to C20 alkyl group, a substituted or unsubstituted C6 to C20 aryl group, a substituted or unsubstituted C3 to C20 cycloalkyl group, a substituted or unsubstituted C1 to C20 heterocycloalkyl group, a substituted or unsubstituted C5 to C20 heteroaryl group, a substituted or unsubstituted C2 to C20 alkylaryl group, or a substituted or unsubstituted C2 to C30 arylalkyl group, $L^1$ and $L^2$ are a single bond, a substituted or unsubstituted C1 to C20 alkylene group, a substituted or unsubstituted C2 to C20 alkenylene group, a substituted or unsubstituted C5 to C20 arylene group, a substituted or unsubstituted C3 to C20 cycloalkylene group, a substituted or unsubstituted C1 to C20 heterocycloalkylene group, a substituted or unsubstituted C1 to C30 heteroarylene group, a substituted or unsubstituted C2 to C20 alkylarylene group, a substituted or unsubstituted C2 to C20 arylalkylene group, or at least one combination of foregoing groups linked to each other, $X^1$ is a single bond, —O—, —NH—, a substituted or unsubstituted C1 to C20 alkylene group, a substituted or unsubstituted C2 to C20 alkenylene group, a substituted or unsubstituted C5 to C20 arylene group, a substituted or unsubstituted C3 to C20 cycloalkylene group, a substituted or unsubstituted C1 to C20 heterocycloalkylene group, a substituted or unsubstituted C1 to C20 heteroarylene group, a substituted or unsubstituted C2 to C20 alkylarylene group, a substituted or unsubstituted C2 to C20 arylalkylene group, or a combination of foregoing groups linked to each other, $R^4$ is independently a C1 to C30 alkyl group, a C5 to C30 alkylsilyl group, a C3 to C30 cycloalkyl group, a C2 to C30 heterocycloalkyl group, a C6 to C30 aryl group, a C2 to C30 heteroaryl group, a C1 to C30 alkoxy group, a C1 to C30 fluoroalkyl group, a C5 to C30 alkenyl group having at least one double bond, or C5 to C30 alkynyl group having at least one triple bond, provided that at least one is a saturated or unsaturated hydrocarbon group having a carbon number of 4 or more, $R^8$ is independently —OH, —COOH, —$NH_2$, —SH, —$SO_3H$, —F, —Cl, —Br, —I, a C1 to C10 alkyl group, a C2 to C10 alkenyl group, a C3 to C20 cycloalkyl group, a C2 to C20 heterocycloalkyl group, a C6 to C20 aryl group, a C2 to C20 heteroaryl group, a C1 to C10 alkoxy group, or a C1 to C10 fluoroalkyl group, provided that at least two are a —OH group, m is an integer of 1 to 5, and n is an integer of 2 to 5.

In the above Chemical Formula 1, $R^1$ to $R^3$ are hydrogen or a C1 to C4 alkyl group, $L^1$ is a substituted or unsubstituted C1 to C10 alkylene group, $R^4$ is a C4 to C30 alkyl group or a C4 to C30 alkenyl group having 1 to 5 double bonds, and m is 1 or 2.

In the above Chemical Formula 2, $R^5$ to $R^7$ are hydrogen or a C1 to C4 alkyl group, $L^2$ is a substituted or unsubstituted C1 to C10 alkylene group, $X^1$ is —O—, —NH— or a C1 to C20 alkylene group, $R^8$ is —OH, and n may be an integer of 2.

The above Chemical Formula 1 is a structural unit showing oil repellency, since a substituent $R^4$ is represented to have at least one C4 to C30 alkyl group or C4 to C30 alkenyl group including about 1 to about 5 double bonds. In addition, the $R^4$ blocks a microorganism such as bacteria and also sterilizes the microorganism. Accordingly, a copolymer according to the embodiment includes an oil-repellent and antibiotic structural unit represented by Chemical Formula 1 and thus may be oil repellent and antibiotic overall.

The above Chemical Formula 2 is a hydrophilic structural unit, since $R^8$ is represented as at least two hydroxy groups. The copolymer includes a hydrophilic structural unit of the above Chemical Formula 2 and is hydrophilic overall.

In one exemplary embodiment, the above Chemical Formula 1 may be represented by the following Chemical Formula 3.

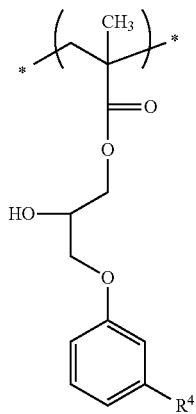

(Chemical Formula 3)

In the above Chemical Formula 3, $R^4$ is the same as defined in the above Chemical Formula 1, for example, a C4 to C30 alkyl group, or a C4 to C30 alkenyl group having 1 to 5 double bonds, for another example, a C10 to C30 alkyl group, or a C10 to C30 alkenyl group having 1 to 3 double bonds.

The above Chemical Formula 2 may be represented by the following Chemical Formula 4.

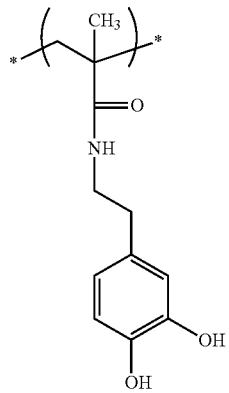

(Chemical Formula 4)

The copolymer includes a first structural unit having oil repellency and a second structural unit having hydrophilicity, and thus may decrease oil-fouling and bio-fouling when applied to a separation membrane for water treatment as shown in the following examples.

As described above, membrane fouling is an important problem that typically decreases life-span of a membrane and thus is to be solved in the membrane industry. A hydrophilic surface may be introduced to the membrane to decrease the fouling problem of a membrane for ultrafiltration (UF) and microfiltration (MF) as well as to decrease reverse osmotic pressure (RO) and forward osmotic pressure (FO), and simultaneously to increase life-span of the membrane, and accordingly a copolymer including a hydrophilic structural unit may be applied to improve fouling resistance of the membrane as shown in the embodiment. Herein, the copolymer may also decrease oil-fouling, since an oil-repellent structural unit is copolymerized with a hydrophilic structural unit in the embodiment. Accordingly, a separation membrane for water treatment coated with the copolymer according to the embodiment on the surface shows improved oil-fouling and decreased bio-fouling effects as proved in the following examples.

In one exemplary embodiment, the copolymer may be represented by the following Chemical Formula 5.

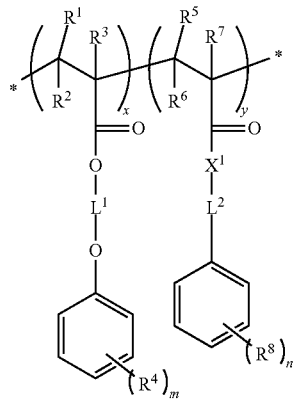

(Chemical Formula 5)

In the above Chemical Formula 5, $R^1$ to $R^8$, $L^1$, $L^2$, $X^1$, and m and n are the same as defined in Chemical Formulae 1 and 2.

In the above Chemical Formula 5, x and y indicate each mole fraction of the structural unit represented by the above Chemical Formula 1 and the structural unit represented by the above Chemical Formula 2, 0<x≤0.5, and 0.5≤y<1. In one exemplary embodiment, x and y may be in the ranges of 0.1≤x≤0.4 and 0.6≤y≤0.9. For example, x and y may be in the ranges of 0.2≤x≤0.3 and 0.7≤y≤0.8.

When the first and second structural units are used in the ratio, the copolymer is insoluble in water but soluble in an organic solvent, and thus may be appropriate for a separation membrane for water treatment.

In addition, when the first and second structural units are used in the ratio, the copolymer shows improved fouling resistance and thus may maintain life-span and antibiosis of a membrane even though the membrane is operated for a long time.

The copolymer may have a number average molecular weight of about 3000 to about 100,000. When the copolymer has a number average molecular weight within the range, the copolymer shows excellent solubility for a solvent and high stability of a coating layer and thus may be easily applied to coating and the like. However, when the copolymer has a number average molecular weight of greater than about 100,000, the copolymer may have decreased solubility for a solvent, while when the copolymer has a number average molecular weight of less than about 3000, a coating layer may have deteriorated stability.

In one exemplary embodiment, the copolymer may be represented by the following Chemical Formula 6.

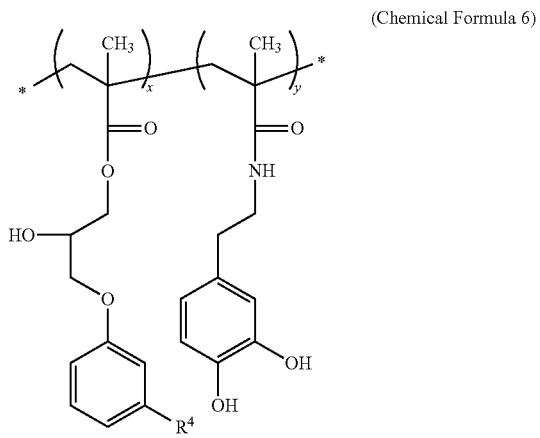

(Chemical Formula 6)

In the above Chemical Formula 6, $R^4$ is the same as defined in the above Chemical Formula 1, and x and y are the same as defined in the above Chemical Formula 5.

In one exemplary embodiment, $R^4$ in the copolymer represented by the above Chemical Formula 6 may be a mixture of the saturated and unsaturated hydrocarbon groups as described below.

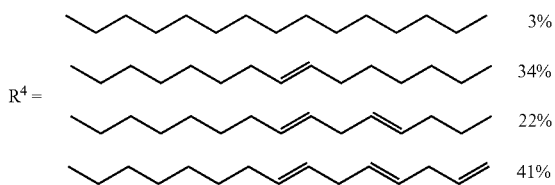

In one exemplary embodiment, a first structural unit represented by the above Chemical Formula 1 may be manufactured by connecting a naturally-existing cardanol compound and methacrylic acid with a linking group. As for the naturally-existing cardanol compound, the $R^4$ substituent may be a mixture of saturated and unsaturated hydrocarbon groups as shown above, and accordingly, when the naturally-existing cardanol compound is used to manufacture the first structural unit during manufacture of the copolymer, the substituent $R^4$ in the copolymer may be a mixture of saturated and unsaturated hydrocarbon groups as shown above.

According to another embodiment, a fouling resistant and antibiotic membrane including the fouling resistant and antibiotic copolymer including the structural unit of the above Chemical Formula 1 and the structural unit of the above Chemical Formula 2 is provided.

The fouling resistant and antibiotic membrane may be applied with fouling resistance and antibiotic characteristics by forming a surface layer including a copolymer having fouling resistance and antibiosis on a membrane requiring the fouling resistance and antibiotic characteristics. The fouling resistant and antibiotic membrane remarkably decreases oil-fouling and bio-fouling and particularly prevents formation of a biofilm and thus, may secure excellent fouling resistant and antibiotic performance. Accordingly, the fouling resistant and antibiotic membrane has a longer life-span and may be less frequently washed and thus is usefully applied to a water treatment device and the like to obtain drinking water.

The fouling resistant and antibiotic membrane has no limit to a shape and a kind, and may be manufactured by using a layer requiring a fouling resistant and antibiotic treatment as an inner layer and forming a surface layer including the copolymer having fouling resistance and antibiosis on the surface of the inner layer.

The fouling resistant and antibiotic membrane may be a membrane for water treatment, for example, a separation membrane for water treatment. The separation membrane for water treatment may be a microfiltration membrane, an ultrafiltration membrane, a nanofiltration membrane, a reverse osmosis membrane, or a forward osmosis membrane according to its use, and it may be divided according to the size of particles to be separated. A method of manufacturing the separation membrane is not limited, and the membrane may be manufactured by known methods while controlling the pore size, the pore structure, and the like.

The separation membrane for water treatment may be, for example, a separation membrane for water treatment wherein the inner layer is a microfiltration membrane, an ultrafiltration membrane, a nanofiltration membrane, a reverse osmosis membrane, or a forward osmosis membrane. Further, for example, the inner layer may be a single membrane formed of a homogeneous material, or a hybrid membrane including a plurality of layers formed of heterogeneous materials.

The separation membrane may be manufactured by forming the surface layer on the inner layer by a well-known method, without limitation. For example, solvent casting, spin casting, wet spinning, dry spinning, or melt spinning may be used, or melt processing such as injecting and melt spinning may be used.

Specifically, the solvent casting may be performed to form the fouling resistant and antibiotic membrane by dissolving the copolymer in a solvent to prepare a solution, and then coating the solution on the surface of an inner layer and drying it. Herein, a concentration of the copolymer contained in the solution may be about 0.1 wt % to about 50 wt %.

The surface layer formed by the method may be a continuous coating layer or a discontinuous coating layer.

When the fouling resistant and antibiotic membrane is a separation membrane for water treatment, the inner layer may include a pore, and a copolymer forming a surface layer may be permeated inside the pore and form a coating layer when the surface layer is coated on the inner layer.

In the case that the fouling resistant and antibiotic membrane is a separation membrane for water treatment, it may be used for various water treatment devices, for example, a water treatment device of a reverse osmosis type, a forward osmosis type, and the like, but is not limited thereto.

The water treatment device may be applied for water purification, wastewater treatment and reuse, seawater desalination, and the like.

FIG. 1 a schematic view of a fouling resistant and antibiotic membrane including an inner layer 102 and a surface layer 101 according to an exemplary embodiment.

In one exemplary embodiment, the surface layer 101 may be manufactured by coating a solution including the copolymer on the inner layer 102.

In one exemplary embodiment, the inner layer may include at least one selected from a polyacrylate-based compound, a polymethacrylate-based compound, a polystyrene-based compound, a polycarbonate-based compound, a polyethylene terephthalate-based compound, a polyimide-based compound, a polybenzimidazole-based compound, a polybenzthiazole-based compound, a polybenzoxazole-based compound, a polyepoxy-based resin compound, a polyolefin-based compound, a polyphenylene vinylene compound, a polyamide-based compound, polyacrylonitrile-based compound, a polysulfone-based compound, a cellulose-based compound, polyvinylidene fluoride (PVDF), polytetrafluoroethylene (PTFE), and a polyvinyl chloride (PVC) compound.

The inner layer may be a single membrane formed of a homogeneous material, or a hybrid membrane including a plurality of layers formed of heterogeneous materials. In addition, the inner layer may be a support layer or a separation layer of a separation membrane for water treatment. The support layer may be porous, and the separation layer may be a semi-permeable layer passing water but blocking a material for separation. When the inner layer is the support layer of a separation membrane for water treatment, the antibiotic and fouling resistant copolymer is coated on the support layer, and a separation layer is additionally formed on the coated antibiotic and fouling resistant copolymer layer. In addition, the antibiotic and fouling resistant copolymer is coated on the support layer and may work as a separation layer of the separation membrane for water treatment. Otherwise, when the inner layer is a separation layer of the separation membrane for water treatment, the antibiotic and fouling resistant copolymer is coated on the separation layer and may improve fouling resistance and antibiosis of the separation membrane.

A solvent that dissolves the copolymer during the coating process may be acetone; acids such as acetic acid, trifluoroacetic acid (TFA), and the like; alcohols such as methanol, isopropanol, 1-methoxy-2-propanol, ethanol, terpineol, and the like; oxygen-containing cyclic compounds such as tetrahydrofuran (THF), 1,4-dioxane, sulfolane, and the like; aromatic compounds including a heteroatom of N, 0, or S such as pyridine and the like; halogen compounds such as chloroform, methylene chloride, and the like; aprotic polar compounds such as dimethylformamide (DMF), dimethylacetamide (DMAC), dimethyl sulfoxide (DMSO), N-methyl-2-pyrrolidone (NMP), and the like; and acetates such as 2-butoxyethylacetate, 2(2-butoxyethoxy)ethylacetate, and the like, but is not limited thereto.

The surface layer of the fouling resistant and antibiotic membrane may have a thickness of about 0.01 μm to about 100 μm, for example about 0.02 μm to about 50 μm. When the surface layer has a thickness within the ranges, fouling resistance and antibiosis may be implemented.

In another embodiment, a water treatment device including the fouling resistant and antibiotic membrane is provided.

The water treatment device may be a forward osmosis water treatment device or a reverse osmosis water treatment device.

FIG. 2 shows a forward osmosis water treatment device according to an exemplary embodiment.

The forward osmosis water treatment device includes: a first housing including a receiving part for a feed solution including a subject material to be separated, a receiving part for an osmosis draw solution having a higher osmotic pressure concentration than the feed solution, and a separation membrane disposed between the receiving part for a feed solution and the receiving part for an osmosis draw solution;

a second housing for storing the osmosis draw solution in order to supply the osmosis draw solution to the first housing and to recover the osmosis draw solution from the housing; and a recovery unit for separating and recovering a solute of the osmosis draw solution.

The separation membrane may include the fouling resistant and antibiotic membrane.

The forward osmosis water treatment device may further include a device discharging the resultant as treated water after separating the osmosis draw solute from the osmosis draw solution including water passing the separation membrane from the feed solution due to osmotic pressure through the recovery unit.

The separation membrane included in the forward osmosis water treatment device is the same as described above.

The feed solution may include sea water, blackish water, wastewater, tap water for drinking water processing, and the like.

The water treatment device may be applied for water purification, wastewater treatment and reuse, seawater desalination, and the like.

Hereinafter, the embodiments are illustrated in more detail with reference to examples. However, the following examples merely exemplify specific embodiments but do not limit the present invention.

MODE FOR INVENTION

Examples

Preparation Example: Synthesis of P(HCPMA-r-DMA) Series

Example 1 (PCDO)

2.22 g of 2-hydroxy-3-cardanylpropyl methacrylate (HCPMA) and 0.22 g of azobisisobutyronitrile (AIBN) are dissolved in 20 mL of THF. The solution is refluxed for a reaction at 100° C. for 2 hours after a condenser is mounted thereon. After the reaction, a polymer PCDO having a repeating unit of the following Chemical Formula 3 is obtained by repeating two to three times of the process of precipitating the reactant in a mixed solution of methanol and distilled water, dissolving a precipitate obtained therefrom in THF, and then re-precipitating it in methanol or distilled water. The polymer PCDO is manufactured by using a cardanyl mixture including saturated and unsaturated hydrocarbon groups in a ratio provided as follows, and the $R^4$ indicates the saturated or unsaturated hydrocarbon group in the following Chemical Formula 3. A number average molecular weight of the obtained PCDO is confirmed to be about 7600.

(Chemical Formula 3)

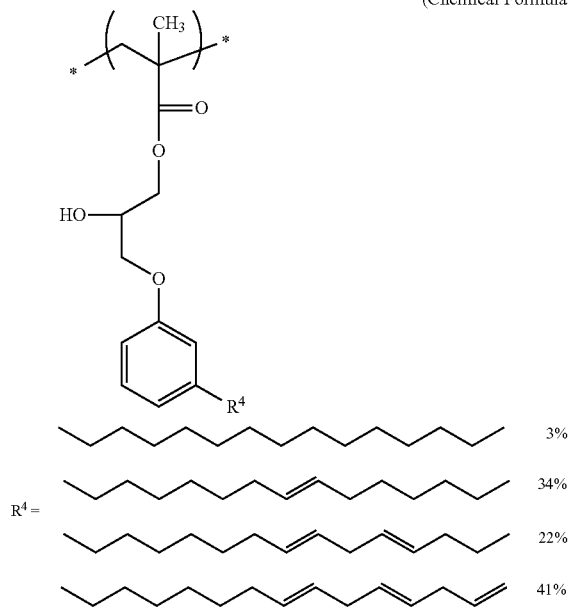

Example 2 (PCD34)

2.22 g of 2-hydroxy-3-cardanylpropylmethacrylate (HCPMA), 1.11 g of dopamine methacrylamide (DMA), and 0.33 g of azobisisobutyronitrile (AIBN) are dissolved in 20 mL of THF. The solution is refluxed for a reaction at 100° C. for 2 hours after a condenser is mounted thereon. After the reaction, a copolymer PCD34 represented by the following Chemical Formula 6 is obtained by repeating two to three times of the process of precipitating the reactant in a mixed solution of methanol and distilled water, dissolving the precipitate in THF again, and re-precipitating it in methanol or distilled water. A number average molecular weight of the obtained PCD34 is confirmed to be about 5500.

(Chemical Formula 6)

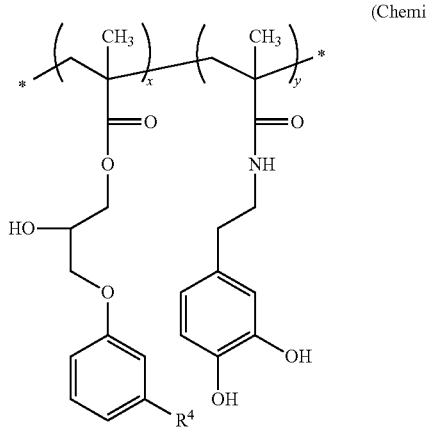

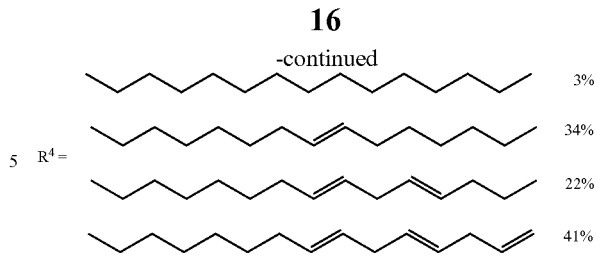

In the above Chemical Formula 6, x=0.66 and y=0.34.

Example 3 (PCD40)

A copolymer PCD40 having x=0.60 and y=0.40 in the above Chemical Formula 6 is synthesized according to the same method as Example 2, except for using 1.76 g of HCPMA, 1.32 g of DMA, and 0.31 g of AIBN. A number average molecular weight of the PCD40 is confirmed to be about 3700.

Example 4: PCD70

A copolymer PCD70 having x=0.30 and y=0.70 in the above Chemical Formula 6 is synthesized according to the same method as Example 2, except for using 0.88 g of HCPMA, 1.76 g of DMA, and 0.26 g of AIBN. A number average molecular weight of the obtained PCD70 is confirmed to be about 5000.

Example 5 (PCD79)

A copolymer PCD40 having x=0.21 and y=0.79 in the above Chemical Formula 6 is synthesized according to the same method as Example 2, except for using 0.44 g of HCPMA, 1.98 g of DMA, and 0.24 g of AIBN. A number average molecular weight of the obtained PCD79 is confirmed to be about 27,900.

Example 6 (PCD100)

3 g of dopamine methacrylamide (DMA) and 0.3 g of azobisisobutyronitrile (AIBN) are dissolved in 20 mL of THF. The solution is refluxed for a reaction at 100° C. for 2 hours after a condenser is mounted thereon. After the reaction, a polymer PCD100 having a repeating unit represented by the following Chemical Formula 4 is obtained by repeating two to three times of the process of precipitating the reactant in a mixed solution of methanol and distilled water, resolving the precipitate in THF, and reprecipitating it in hexane. A number average molecular weight of the obtained PCD100 is confirmed to be about 32,000.

(Chemical Formula 4)

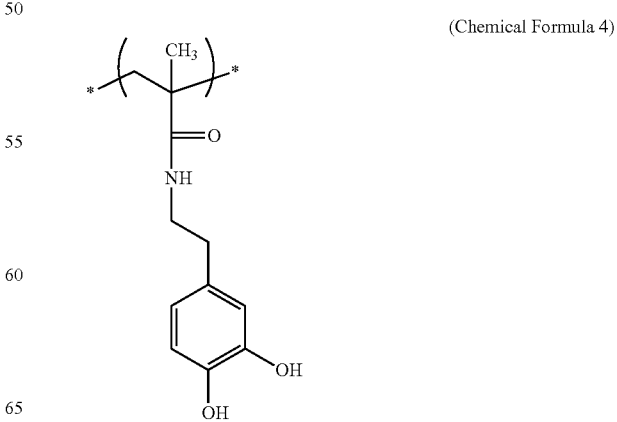

Evaluation: Solubility Characteristics

Solubility of the synthesized compounds is evaluated by impregnating 10 mg of each compound respectively in 2 g of water and 2 g of methanol, allowing them to stand at room temperature for 24 hours, and then examining them with the naked eye to determine whether they are transparent or not and thus soluble or insoluble, respectively. The results are provided in Table 1.

TABLE 1

|  | Solubility for water | Solubility for methanol |
|---|---|---|
| Example 1 PCD0 | Insoluble | Insoluble |
| Example 2 PCD34 | Insoluble | Insoluble |
| Example 3 PCD40 | Insoluble | Insoluble |
| Example 4 PCD70 | Insoluble | Soluble |
| Example 5 PCD79 | Insoluble | Soluble |
| Example 6 (PCD100) | Soluble | Soluble |

Preparation Example 1: Manufacture of Membrane for Fouling Resistance

A solution obtained by dissolving the PCDO of Example 1 in hexane and each solution obtained by respectively dissolving the PCD70 of Example 4 and PCD79 of Example 5 in methanol are respectively spin-coated on the surface of a commercially-available polysulfone membrane. The spin-coating is performed under conditions of a sample concentration of 0.5 wt %, 2000 rpm, and 60 seconds. The PCD34 of Example 2 and the PCD40 of Example 3 show almost no solubility for methanol and hexane and thus are difficult to spin-coat. However, the PCD100 of Example 2 shows high solubility for water and is difficult to secure long-term fouling resistance characteristics. Accordingly, the above solubility results show that a compound may have fouling resistance and solubility when the HCPMA and DMA are included in an appropriate ratio.

Evaluation (1) Surface Morphology Analysis of Membrane for Fouling Resistance

Surface morphology of a separation membrane according to the present invention is analyzed by respectively coating the PCDO of Example 1, the PCD70 of Example 4, and the PCD79 of Example 5 on the surface of a polysulfone membrane as described above, radiating ultraviolet (UV) light thereon to form a separation membranes for fouling resistance, and examining the surface of the separation membranes for fouling resistance with a scanning electron microscope (SEM), and the results are provided in FIG. 3. FIG. 3 (a) provides a scanning electron microscope photograph showing a 50,000 times-enlarged morphology structure of a commercially-available ultrafiltration polysulfone membrane, and FIGS. 3 (b) to 3(d) provide scanning electron microscope photographs showing 50,000 times-enlarged morphology structures of the separation membranes for fouling resistance of Examples 1, 4, and 5 cured by radiating UV light on the commercially-available ultrafiltration polysulfone membrane of FIG. 3 (a). As shown in the drawings, separation membranes for fouling resistance obtained by respectively coating PCDO, PCD70, and PCD79 have a similar pore size to that of the commercially-available polysulfone ultrafiltration membrane.

(2) Surface Wettability Analysis of Membrane for Fouling Resistance

Contact angle changes of the surface of each separation membrane with air in a water system during the experiment are measured, and the results are provided in FIG. 4. As shown in FIG. 4, a separation membrane obtained by coating a methanol solution including 0.5 wt % of the PCD79 (Example 5) maintains the smallest contact angle with water (the largest contact angle with air) and is the most hydrophilic, and a separation membrane obtained by coating a methanol solution including 0.5 wt % of the PCD70 (Example 4) and a separation membrane obtained by coating a hexane solution including 0.5 wt % of the PCDO (Example 1) in order show a smaller surface contact angle with water. These three separation membranes show almost no contact angle change. On the other hand, a polysulfone ultrafiltration membrane coated with no solution shows the largest contact angle with water and is the least hydrophilic.

In addition, contact angle changes of the surface of each separation membrane with decane in a water system during the experiment are measured, and the results are provided in FIG. 5. As shown in FIG. 5, a separation membrane obtained by coating a methanol solution including 0.5 wt % of the PCD79 (Example 5) with decane maintains the smallest contact angle and shows the highest oil-repellency, and a separation membrane obtained by coating a methanol solution including 0.5 wt % of the PCD70 (Example 4) and a separation membrane obtained by coating a hexane solution including 0.5 wt % of the PCDO (Example 1) in order show a smaller surface contact angle with decane. These three separation membranes show almost no contact angle as time passes. On the other hand, a polysulfone ultrafiltration membrane coated with no solution with decane shows the largest contact angle and the least oil repellency.

(3) Pure Water Permeation Flux

To determine performance of the ultrafiltration membranes prepared above, their pure water permeation flux is measured, and the results are described in the following Table 2. First, each separation membrane is located on a cell having an effective area of about 41.8 $cm^2$ for measurement, and then compacted under a pressure of about 2 $Kg/cm^2$ for about 2 hours and measured under a pressure of about 1 $Kg/cm^2$. The permeation flux is calculated by using the following equation.

$$F=V/(A*t)$$

Herein, V denotes the permeation flow rate, A denotes the area of the membrane, and t denotes the operation time.

TABLE 2

|  | Coating condition | Pure water permeation flux (LMH) |
|---|---|---|
| Ultrafiltration membrane (polysulfone) | — | 480 |
| Ultrafiltration membrane coated with PCD0 (Example 1) | 0.5 wt %, 2000 rpm, 60 s | 420 |
| Ultrafiltration membrane coated with PCD70 (Example 4) | 0.5 wt %, 2000 rpm, 60 s | 425 |
| Ultrafiltration membrane coated with PCD79 (Example 5) | 0.5 wt %, 2000 rpm, 60 s | 410 |

The LMH denotes the amount of water passing per unit hour, the L denotes the amount of water passing through the membrane (liter), the M denotes the area of the membrane ($m^2$), and the H denotes passing time (hours). In other words, it is an evaluation unit for how many liters of water pass through the membrane area of about 1 $m^2$ in about 1 hour.

As shown in Table 3, the separation membranes obtained by coating a hexane solution including 0.5 wt % of the PCDO (Example 1) and methanol solutions respectively including 0.5 wt % of PCD70 or PCD79 show about 12.5%, 11.5%, and 14.6% less pure water permeation flux than a polysulfone ultrafiltration membrane before the coating.

(4) Anti-Biofouling

Fouling resistance performance of the coated ultrafiltration membranes is measured by measuring their permeation flux.

First, the permeation flux is measured at a pressure of 1 $Kg/cm^2$ for 3 hours after each separation membrane is mounted in a cell having an effective area of 41.8 $cm^2$. FIG. 7 is a graph showing permeation flux change of the separation membranes depending on time, and their permeation flux maintenance ratios after 3 hours are calculated and provided in the following Table 3. As for a fouling test material, a protein of bovine serum albumin (BSA) is used with a concentration of 1.0 mg/mL in a 0.1 M phosphate-buffered saline (PBS) solution.

TABLE 3

|  | Permeation flux maintenance ratio after 3 hours (%) |
|---|---|
| Ultrafiltration membrane (polysulfone) | 21 |
| Ultrafiltration membrane coated with PCD0 (Example 1) | 23 |
| Ultrafiltration membrane coated with PCD70 (Example 4) | 84 |
| Ultrafiltration membrane coated with PCD79 (Example 5) | 88 |

As shown in Table 3, the ultrafiltration membrane before the coating and the separation membranes obtained by coating the PCDO (Example 1), the PCD70 (Example 4), and the PCD79 solution (Example 5) respectively show a permeation flux maintenance ratio of about 21, 23, 84, and 86%. The PCD79 (Example 5) shows the strongest resistance against protein fouling, and the PCDO (Example 1) and the ultrafiltration membrane show similar resistance against protein fouling.

(5) Anti-Oilfouling

Fouling resistance performance of the coated ultrafiltration membranes is evaluated by measuring their permeation flux.

First, the permeation flux is measured at a pressure of 1 $Kg/cm^2$ for 3 hours after the separation membranes are respectively mounted in a cell having an effective area of 41.8 $cm^2$. FIG. 8 is a graph showing a permeation flux change depending on time, and a permeation flux maintenance ratio after 3 hours is calculated and provided in the following Table 4. Vacuum pump oil is used as a fouling test material with a concentration of 0.9 mg/mL in a distilled water solution, and sodium dodecyl sulfate (SDS) is used as a surfactant with a concentration of 0.1 mg/mL.

TABLE 4

|  | Permeation flux maintenance ratio after 3 hours (%) |
|---|---|
| Ultrafiltration membrane (polysulfone) | 52 |
| Ultrafiltration membrane coated with PCD0 (Example 1) | 58 |

TABLE 4-continued

|  | Permeation flux maintenance ratio after 3 hours (%) |
|---|---|
| Ultrafiltration membrane coated with PCD70 (Example 4) | 72 |
| Ultrafiltration membrane coated with PCD79 (Example 5) | 76 |

As shown in Table 4, the ultrafiltration membrane and the separation membranes obtained by coating the PCDO (Example 1), the PCD70 (Example 4), and the PCD79 (Example 5) respectively maintain a permeation flux maintenance ratio of about 52, 58, 72, and 76%. The PCD79 (Example 5) shows the highest resistance against oil fouling, and the PCD70 (Example 4), the PCDO (Example 1), and the ultrafiltration membrane in order show lower resistance against oil fouling.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A fouling resistant and antibiotic copolymer, comprising a first structural unit represented by the following Chemical Formula 1 and a second structural unit represented by the following Chemical Formula 2:

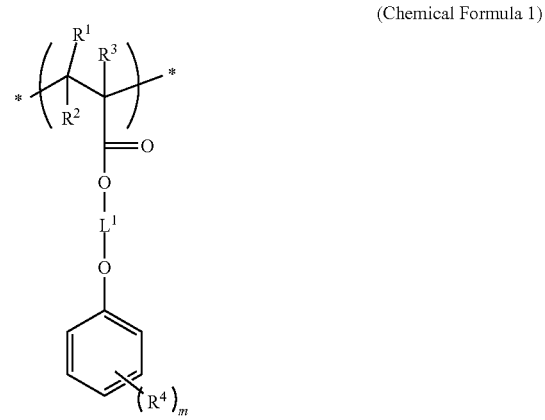

(Chemical Formula 1)

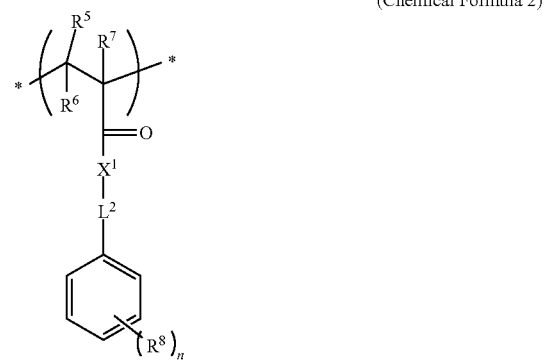

(Chemical Formula 2)

wherein, in the above Chemical Formulae 1 and 2,
$R^1$ to $R^3$ and $R^5$ to $R^7$ are independently hydrogen, a substituted or unsubstituted C1 to C20 alkyl group, a substituted or unsubstituted C6 to C20 aryl group, a substituted or unsubstituted C3 to C20 cycloalkyl group, a substituted or unsubstituted C1 to C20 heterocycloalkyl group, a substituted or unsubstituted C5 to C20 heteroaryl group, a substituted or unsubstituted C2 to C20 alkylaryl group, or a substituted or unsubstituted C2 to C30 arylalkyl group, $L^1$ and $L^2$ are a single bond, a substituted or unsubstituted C1 to C20 alkylene group, a substituted or unsubstituted C2 to C20 alkenylene group, a substituted or unsubstituted C5 to C20 arylene group, a substituted or unsubstituted C3 to C20 cycloalkylene group, a substituted or unsubstituted C1 to C20 heterocycloalkylene group, a substituted or unsubstituted C1 to C30 heteroarylene group, a substituted or unsubstituted C2 to C20 alkylarylene group, a substituted or unsubstituted C2 to C20 arylalkylene group, or a combination thereof linked to each other, $X^1$ is a single bond, —O—, —NH—, a substituted or unsubstituted C1 to C20 alkylene group, a substituted or unsubstituted C2 to C20 alkenylene group, a substituted or unsubstituted C5 to C20 arylene group, a substituted or unsubstituted C3 to C20 cycloalkylene group, a substituted or unsubstituted C1 to C20 heterocycloalkylene group, a substituted or unsubstituted C1 to C20 heteroarylene group, a substituted or unsubstituted C2 to C20 alkylarylene group, a substituted or unsubstituted C2 to C20 arylalkylene group, or a combination thereof linked to each other, $R^4$ is independently a C1 to C30 alkyl group, a C5 to C30 alkylsilyl group, a C3 to C30 cycloalkyl group, a C2 to C30 heterocycloalkyl group, a C6 to C30 aryl group, a C2 to C30 heteroaryl group, a C1 to C30 alkoxy group, a C1 to C30 fluoroalkyl group, a C5 to C30 alkenyl group having at least one double bond, or a C5 to C30 alkynyl group having at least one triple bond, provided that at least one thereof is a saturated or unsaturated hydrocarbon group having a carbon number of 4 or more, $R^8$ is independently —OH, —COOH, —NH₂, —SH, —SO₃H, —F, —Cl, —Br, —I, a C1 to C10 alkyl group, a C2 to C10 alkenyl group, a C3 to C20 cycloalkyl group, a C2 to C20 heterocycloalkyl group, a C6 to C20 aryl group, a C2 to C20 heteroaryl group, a C1 to C10 alkoxy group, or a C1 to C10 fluoroalkyl group, provided at least two thereof are OH groups, m is an integer of 1 to 5, and
n is an integer of 2 to 5.

2. The copolymer of claim 1, wherein, in the above Chemical Formula 1, $R^1$ to $R^3$ are hydrogen or a C1 to C4 alkyl group, $L^1$ is a substituted or unsubstituted C1 to C10 alkylene group, $R^4$ is a C4 to C30 alkyl group or a C4 to C30 alkenyl group including 1 to 5 double bonds, and m is 1 or 2.

3. The copolymer of claim 1, wherein, in the above Chemical Formula 2, $R^8$ to $R^7$ are hydrogen or a C1 to C4 alkyl group, $L^2$ is a substituted or unsubstituted C1 to C10 alkylene group, $X^1$ is —O—, —NH—, or a C1 to C20 alkylene group, $R^8$ is —OH, and n is 2.

4. The copolymer of claim 1, wherein the above Chemical Formula 1 is represented by the following Chemical Formula 3:

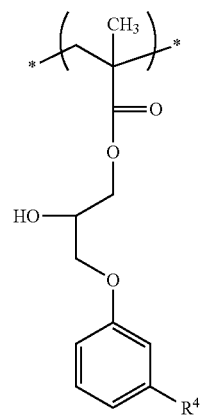

(Chemical Formula 3)

wherein, in the above Chemical Formula 3, $R^4$ is independently a C4 to C30 alkyl group or a C4 to C30 alkenyl group including 1 to 5 double bonds in each repeating unit.

5. The copolymer of claim 1, wherein the above Chemical Formula 2 is represented by the following Chemical Formula 4:

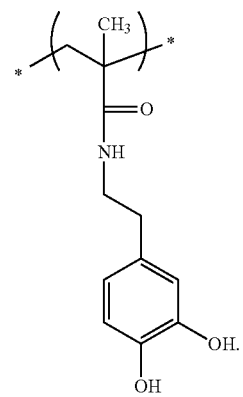

(Chemical Formula 4)

6. The copolymer of claim 1, which is represented by the following Chemical Formula 5:

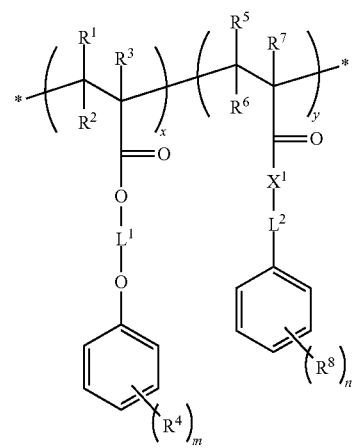

(Chemical Formula 5)

wherein, in the above Chemical Formula 5,
R$^1$ to R$^8$, L$^1$, L$^2$, X$^1$, m, and n are the same as defined in the Chemical Formulae 1 and 2,
x and y indicate each mole fraction of the structural unit represented by the above Chemical Formula 1 and the structural unit represented by the above Chemical Formula 2, $0<x\leq0.5$, and $0.5\leq y<1$.

7. The copolymer of claim 6, wherein x and y are in the ranges of $0.1\leq x\leq0.4$, and $0.6\leq y\leq0.9$.

8. The copolymer of claim 6, wherein x and y are in the ranges of $0.2\leq x\leq0.3$ and $0.7\leq y\leq0.8$.

9. The copolymer of claim 1, which has a number average molecular weight of about 3000 to about 100,000.

10. The copolymer of claim 1, which is represented by the following Chemical Formula 6:

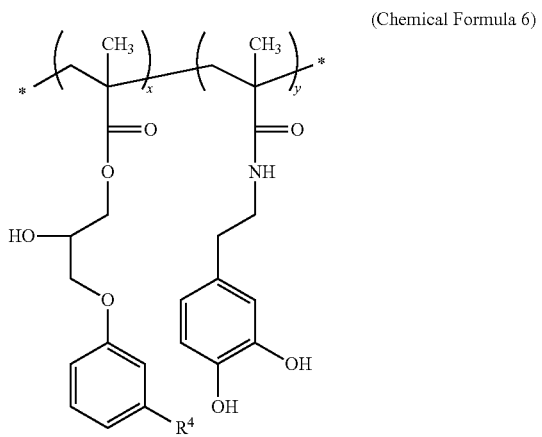

(Chemical Formula 6)

wherein, in the above Chemical Formula 6,
$0.1\leq x\leq0.4$, $0.6\leq y\leq0.9$, and R$^4$ is independently a C10 to C20 alkyl group or a C10 to C20 alkenyl group including 1 to 5 double bonds in each repeating unit.

11. A fouling resistant and antibiotic membrane comprising the copolymer of claim 1.

12. The fouling resistant and antibiotic membrane of claim 11, which comprises a surface layer comprising the copolymer on an inner layer comprising at least one selected from a polyacrylate-based compound, a polymethacrylate-based compound, a polystyrene-based compound, a polycarbonate-based compound, a polyethylene terephthalate-based compound, a polyimide-based compound, a polybenzimidazole-based compound, a polybenzthiazole-based compound, a polybenzoxazole-based compound, a polyepoxy-based resin compound, a polyolefin-based compound, a polyphenylene vinylene compound, a polyamide-based compound, a polyacrylonitrile-based compound, a polysulfone-based compound, a cellulose-based compound, polyvinylidene fluoride (PVDF), polytetrafluoroethylene (PTFE), and a polyvinyl chloride (PVC) compound.

13. The fouling resistant and antibiotic membrane of claim 12, wherein the inner layer is a single membrane formed of a homogeneous material, or a hybrid membrane including a plurality of layers formed of heterogeneous materials.

14. The fouling resistant and antibiotic membrane of claim 12, wherein the surface layer is manufactured by coating a solution including the copolymer on the surface of the inner layer.

15. The fouling resistant and antibiotic membrane of claim 12, wherein the surface layer has a thickness of about 0.01 μm to about 100 μm.

16. The fouling resistant and antibiotic membrane of claim 12, wherein the inner layer comprises polysulfone.

17. A separation membrane for water treatment comprising the fouling resistant and antibiotic membrane of claim 11.

18. A water treatment device comprising the separation membrane for water treatment of claim 17.

* * * * *